United States Patent
Molin et al.

(10) Patent No.: US 11,142,214 B2
(45) Date of Patent: Oct. 12, 2021

(54) SYSTEM, CONTROLLER AND METHOD FOR MAINTAINING AN ADVANCED DRIVER ASSISTANCE SYSTEM AS ACTIVE

(71) Applicant: Bendix Commercial Vehicle Systems LLC, Elyria, OH (US)

(72) Inventors: Hans M Molin, Mission Viejo, CA (US); Andreas U Kuehnle, Villa Park, CA (US); Cathy L Boon, Orange, CA (US); Thomas J Hayes, Lakewood, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 220 days.

(21) Appl. No.: 16/533,071

(22) Filed: Aug. 6, 2019

(65) Prior Publication Data

US 2021/0039667 A1 Feb. 11, 2021

(51) Int. Cl.
*B60W 50/14* (2020.01)
*B60W 30/182* (2020.01)
(Continued)

(52) U.S. Cl.
CPC .......... *B60W 50/14* (2013.01); *B60W 30/182* (2013.01); *G05D 1/0088* (2013.01);
(Continued)

(58) Field of Classification Search
CPC .............. G05D 1/0274; G05D 1/0088; G05D 2201/0213; G05D 1/0061; B60W 50/14;
(Continued)

(56) References Cited

U.S. PATENT DOCUMENTS 8,521,352 B1  8/2013 Ferguson
8,666,591 B2  3/2014 Stahlin
(Continued)

FOREIGN PATENT DOCUMENTS

CN  104778850  * 7/2015 .......... G08G 1/0962
CN  105620490 A  6/2016
(Continued)

OTHER PUBLICATIONS

Murray Slovick, "Autonomous Cars and Overcoming the inadequacies of Road Mapping", Aug. 26, 2019 (Year: 2019).*
(Continued)

*Primary Examiner* — Peter D Nolan
*Assistant Examiner* — Kenneth M Dunne
(74) *Attorney, Agent, or Firm* — Cheryl Greenly; Brian Kondas; Eugene Clair (57) ABSTRACT

A system and method for assembling and using a map supports advanced driver assistance systems (ADAS) on a host vehicle. The map indicates which roadway segments can support automated driving. The map may also indicate which vehicle sensor signal interpretation and vehicle control algorithms shall be used on those segments. The map may be assembled on a host vehicle, transmitted to a server and collated with maps from other vehicles equipped with ADAS. The host vehicle may download the other maps from the server for use in locations where the driver assistance sensor input from the host vehicle may not be dependable.

13 Claims, 7 Drawing Sheets

(51) Int. Cl.
*G05D 1/00* (2006.01)
*G05D 1/02* (2020.01)
*B60W 50/00* (2006.01)

(52) U.S. Cl.
CPC ... *G05D 1/0274* (2013.01); *B60W 2050/0072* (2013.01); *B60W 2554/00* (2020.02); *B60W 2556/45* (2020.02); *G05D 2201/0213* (2013.01)

(58) Field of Classification Search
CPC .......... B60W 30/182; B60W 2554/00; B60W 2556/45; B60W 2050/0072; B60W 60/0059; B60W 60/005
See application file for complete search history.

(56) References Cited

U.S. PATENT DOCUMENTS

| | | | |
|---|---|---|---|
| 8,744,675 B2 | 6/2014 | King | |
| 9,127,955 B2 | 9/2015 | Tsmihoni | |
| 9,475,500 B2 | 10/2016 | Grimm | |
| 9,958,865 B2 | 5/2018 | Hoskeri | |
| 10,036,648 B1 | 7/2018 | Hobbs | |
| 10,042,362 B2 | 8/2018 | Fairfield | |
| 10,161,754 B2 | 12/2018 | Matsushita | |
| 10,324,463 B1* | 6/2019 | Konrardy | G01C 21/3407 |
| 2003/0025597 A1 | 2/2003 | Schofield | |
| 2011/0118979 A1 | 5/2011 | Mao | |
| 2015/0304874 A1 | 10/2015 | Oldewurtel | |
| 2016/0091325 A1 | 3/2016 | Takamatsu | |
| 2016/0178381 A1* | 6/2016 | Lynch | G01C 21/32 701/23 |
| 2016/0231746 A1 | 8/2016 | Hazelton | |
| 2016/0252904 A1 | 9/2016 | Sakai | |
| 2016/0305787 A1 | 10/2016 | Sato | |
| 2017/0110012 A1 | 4/2017 | Lewis | |
| 2017/0123434 A1* | 5/2017 | Urano | B60W 40/10 |
| 2017/0277193 A1* | 9/2017 | Frazzoli | B60W 60/0011 |
| 2018/0151066 A1* | 5/2018 | Oba | G01C 21/3407 |
| 2019/0003839 A1* | 1/2019 | Hu | G05D 1/0088 |
| 2019/0204092 A1* | 7/2019 | Wheeler | G05D 1/0246 |
| 2019/0227545 A1* | 7/2019 | Yoo | G01C 21/3602 |
| 2019/0265045 A1* | 8/2019 | Baik | G05D 1/0274 |
| 2020/0103919 A1* | 4/2020 | Passmann | G05D 1/0274 |

FOREIGN PATENT DOCUMENTS

| | | | |
|---|---|---|---|
| CN | 106004639 B | 10/2018 | |
| CN | 106504367 A | 3/2019 | |
| CN | 11242638 * | 2/2021 | G01S 17/02 |
| EP | 3381758 A1 | 10/2018 | |
| EP | 3159853 B1 | 3/2019 | |
| WO | WO2012076444 A1 | 6/2012 | |
| WO | WO2015184578 A1 | 12/2015 | |
| WO | WO2018198547 * | 11/2018 | G01V 9/00 |
| WO | 2019143040 A1 | 7/2019 | |

OTHER PUBLICATIONS

European Patent Office, "PCT International Search Report and Written Opinion," Report, dated Oct. 30, 2020, 14 pages, European Patent Office, Rijswijk, Netherlands.

* cited by examiner

SYSTEM, CONTROLLER AND METHOD FOR MAINTAINING AN ADVANCED DRIVER ASSISTANCE SYSTEM AS ACTIVE

BACKGROUND

The present invention relates to embodiments of a system, controller and method for creating maps of areas capable of supporting the actions of an automated driver assistance system (ADAS) actions and maintaining the ADAS as active.

The ability of an advanced driver assistance system to operate depends on the quality of the environment and the reliability of the received signals from the vehicle environment sensors. If satisfactory signals are not present, the advanced driver assistance system generally warns the driver and switches back to manual driving mode.

Furthermore, vehicles in general need clear, clean roadways to navigate properly, regardless of whether the vehicle is fully automated, driver assisted, or fully manually driven. Knowledge about one section of a roadway, such as that it has missing guardrails or that there is debris on the roadway, may be learned by a vehicle equipped with vehicle environment sensors at one period in time. This information can be helpful to other vehicles traversing the same roadway at different periods in time.

There is a need to improve signal analysis and data sharing among advanced driver assistance systems so that the advanced driver assistance systems may remain active.

SUMMARY

Various embodiments of an apparatus for use in an advanced driver assistance system comprise a plurality of vehicle environment sensors and a controller. The controller includes control logic for controlling an automated driving mode; at least one input for receiving present signals from the plurality of vehicle environment sensors and a memory for storing the present signals of the plurality of vehicle environment sensors with a location stamp and a time of day stamp. The control logic stores past signals from the plurality of driving environment sensors in the memory; collates the present signals from the plurality of vehicle environment sensors; compares the present signals of the plurality of driving environment sensors to a minimum requirement for maintaining the automated driving mode; compares the past signals matching the location stamp and time of day stamp to the minimum requirement when the present signals do not meet the minimum requirement; and maintains the automated driving mode when the past signals in memory exceed the minimum requirement.

Various embodiments of a server for compiling advanced driver assistance system data from a plurality of vehicles comprises a receiver for receiving a map of ADAS-capable locations from a plurality of vehicles, each map having a time of day stamp; a transmitter for transmitting the map indicative of locations where automated driver assistance mode can be enabled to a first vehicle of the plurality of vehicles; and a database. The database compiles the maps from the plurality of vehicles to determine if an automated driving mode of the first vehicle can be maintained at a specific time of day and location.

In accordance with another aspect, various methods for maintaining an automated driving mode comprise receiving sensor signals from the vehicle; transmitting control signals to the vehicle to maintain an autonomous driving mode; determining based on the sensor signals whether to maintain the autonomous driving mode; and transmitting a warning to the driver if the vehicle is going to be taken out of the automated driving mode in response to the sensor signals not meeting a predetermined minimum.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
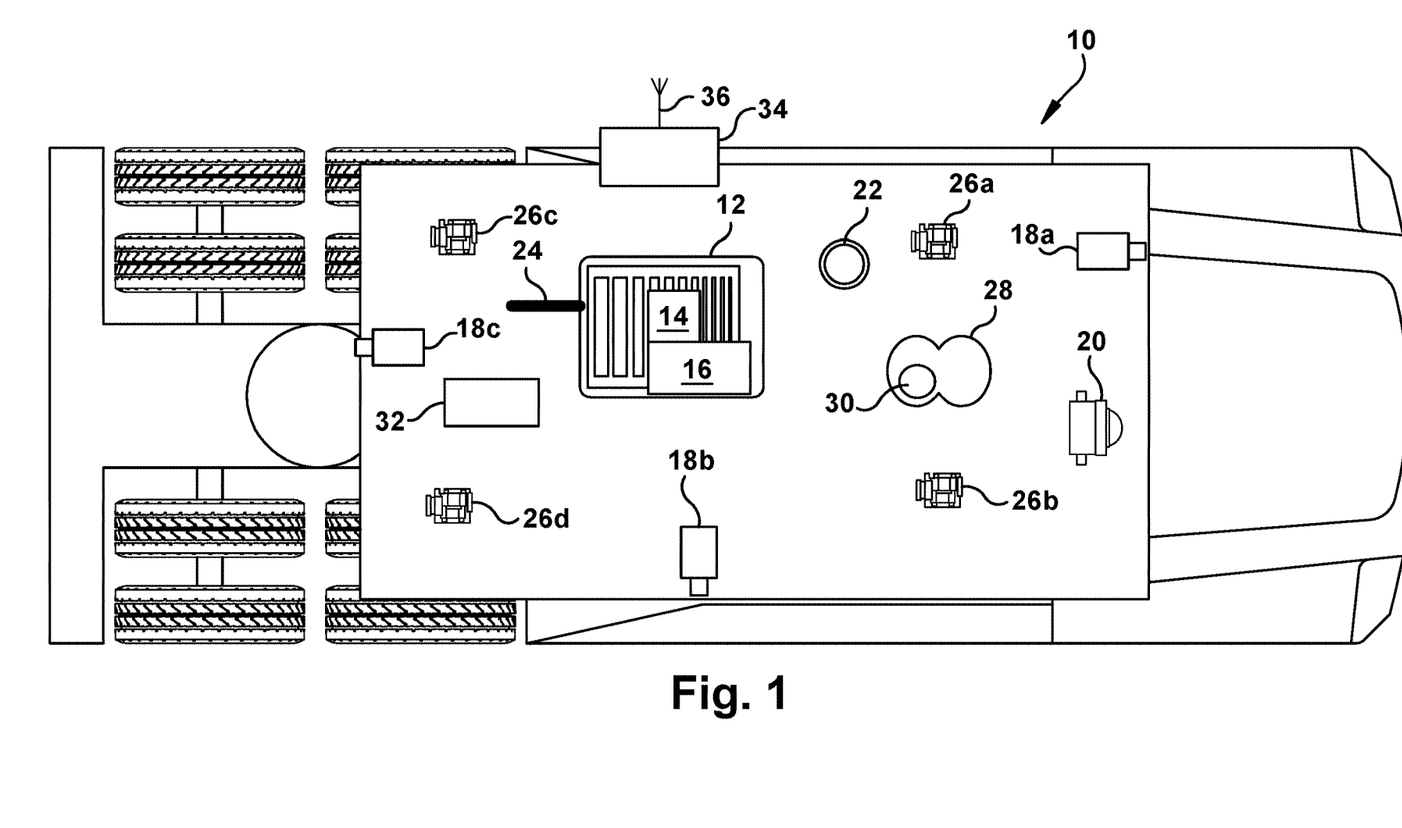
FIG. 1 illustrates a vehicle having advanced driver assistance features according to one example of the present invention.

FIG. 1 illustrates a host vehicle 10 having an advanced driver assistance system (ADAS) according to one example of the present invention. The host vehicle 10 includes a plurality of vehicle environment sensors that receive information about the vehicle and the driving environment.

The plurality of sensors may include a camera 18a. The camera 18a may be a forward looking camera for viewing and analyzing the area in front of the host vehicle 10. The plurality of sensors may include a camera 18b that is a side view camera and a camera 18c that is a rear view camera. The video signals of cameras 18a, 18b, 18c may be analyzed to detect an object's presence, size, longitudinal distance and lateral distance with respect to the host vehicle 10. The cameras 18a, 18b, 18c can detect, via image signal interpretation, multiple stationary or moving objects within a wide range to the front, side and rear of the host vehicle. The cameras 18a, 18b, 18c capture images of objects from around the host vehicle 10 such as lane markings and guardrails, along with their number and type, to determine road factors. The cameras 18a, 18b, 18c may also capture images of objects such as debris and dead animals on or near the roadway.

The plurality of sensors may include at least one radar 20 that is a forward radar. The radar 20 transmits and receives radar signals, which are electromagnetic waves used to detect an object's presence, longitudinal distance, lateral distance, speed and direction with respect to the host vehicle 10. The radar 20 can detect multiple stationary or moving objects within a wide range to the front and sides of the host vehicle 10. The radar 20 uses signals to determine the location and motion of other vehicles and radar-reflective objects on and proximate to the roadway.

The plurality of sensors on the host vehicle 10 may also include infrared, LIDAR and sonar sensors to produce the range, directions and range rate(s) of objects around the host vehicle 10.

The host vehicle 10 includes brake control components 26a, 26b, 26c, 26d associated with each wheel end or each axle. The brake control components 26a, 26b, 26c, 26d are responsive to control signals to affect braking of the host vehicle 10. The host vehicle 10 also includes a yaw rate and accelerometer device 32 to measure the movement of the host vehicle 10 in response to the driver's actions or automated driving actions.

The host vehicle 10 includes steering control component 28. The steering control component 28 is responsive to control signals to affect the travel direction of the host vehicle 10. The steering control component 28 also includes a steering angle sensor 30 to monitor the angle at which the driver of the host vehicle 10 is turning the wheel.

The host vehicle 10 includes a transmitter and receiver 34. The transmitter and receiver 34 may be wireless and may have antenna 36. This transmitter and receiver 34 is compatible with Global Positioning Systems and may use satellite transmissions, Wi-Fi or cellular transmissions to transmit information from the host vehicle 10 or to receive information for processing by the host vehicle 10.

The host vehicle 10 includes a driver information device 22. The driver information device 22 may be a warning lamp, an audible system, or may be a display device that communicates additional information to the driver.

The host vehicle 10 includes a controller 12. The controller 12 includes a communications port for communicating with a vehicle communication bus 24. The controller 12 includes inputs for receiving the signals from the plurality of sensors or the controller 12 may receive the signals via the vehicle communication bus 24. The controller 12 includes a port for communicating with the transmitter and receiver 34. The controller 12 may directly control the driver information device 22, brake control components 26a, 26b, 26c, 26d and steering control component 28, or may communicate control signals and other information via the vehicle communication bus 24 to be used in vehicle control.

The controller 12 includes a processor with control logic 16 for interpreting the vehicle environmental signals. The control logic 16 communicates with a memory 14, which may include volatile memory, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 16. The memory 14 stores information from the plurality of sensors, which may be time-stamped and vehicle-location stamped by the control logic 16. Collation of vehicle data includes temporal, spatial and directional data. The controller considers time and space intervals, as well as heading directions.

The control logic 16 analyzes the information received from the cameras 18a, 18b, 18c, radar 20 and other sensors on the vehicle to determine if automated driving, such as lane-keeping and active cruise control, can be initiated and maintained. In general, the signals from the vehicle environment sensors must meet a minimum quality requirement in order to maintain the automated driving mode. A minimum quality signal may be defined as a nearly continuously present signal, of a low noise level, and high reliability level, when in a multiple signal context. The minimum quality signal must also be plausible. Examples of signals are visualized in FIG. 2. When a video signal no longer meets the minimum quality requirement, for example, the lane departure warning or other automated driving function will be discontinued.

The control logic 16 may control the automated driving actions of the host vehicle 10 by transmitting signals to the steering control component 28, engine (not shown) and braking components 26a, 26b, 26c, 26d using information from the cameras 18a, 18b, 18c, the radar 20, the steering angle sensor 30 and the yaw rate and accelerometer device 32. The control logic 16 may communicate the vehicle environment sensor signals via the communications bus 24 for other vehicle systems to use in their decision-making process.

Warning only, driver supporting, and fully automated driving systems rely on the quality of the information they receive from the vehicle environment via the sensors. Sensors may incur loss of signal, excessive noise, or clutter conditions. In some instances, the signals received from the plurality of sensors on the host vehicle 10 may disagree with a high definition map and/or database being used by the ADAS. When the quality of the signals is low, the signals are sporadic or non-existent, or the signal varies among multiple values, prior art systems will warn the driver and transfer operation back to the driver from the automated or driver assisted mode.

Sections of roadways that may be suitable for ADAS operation are identified when the vehicle behavior on the automatically driven sections would be similar to that of the manually driven behavior (i.e. the driver becomes a verification system for the control decisions taken during automatic driving, and vice versa). One basis of the present invention is that the signals the vehicle environment sensors produce when using the automated driving features shall be substantially the same as those that the driver produces when in the manual driving mode. For instance, given that drivers generally drive in about the middle of a lane; the lane position sensors are expected to produce similar, mid-lane values to remain in the automated driving mode. If the driver continues on at a steady speed, the processed radar signals shall also indicate that ADAS may continue. ADAS-capable road sections may thus be defined, in part, as those where the driver and sensors agree.

Sensors by themselves do not produce, generally, vehicle control signals. For instance, radars may produce noisy multiple tracks, of which one must be filtered and chosen as being that of a possible in-lane target ahead. Cameras do not measure lane position or object range directly; rather, only after image processing, do these values become available. These processed signals shall be repeatedly corroborated by driver behavior. Those roadway sections where the signals are repeatedly corroborated by driver behavior are identified as ADAS-capable.

For example, in the present control logic 16, a predictor-corrector based filter, such as a Kalman filter, filters, smooths, predicts and tracks the lane marking locations for the lane keeping system that is part of ADAS. With this filter, a difference, or residual, between the filtered value and the measured raw value of the lane marking is created. A noise level is also calculated, expressing the variation in the filtered value from the likely true value. The filtered, and when necessary, predicted values are used for vehicle control. Assuming that the driver stays approximately mid-lane, then the filtered and predicted values shall also indicate approximate mid-lane, and shall do so with low noise.

Therefore, an apparatus for use in an advanced driver assistance system comprises a plurality of vehicle environment sensors and a controller. The controller includes control logic for controlling an automated driving mode; at least one input for receiving present signals from the plurality of vehicle environment sensors and a memory for storing the present signals of the plurality of vehicle environment sensors with a location stamp and a time of day stamp. The control logic stores past signals from the plurality of driving environment sensors in the memory; collates the present signals from the plurality of vehicle environment sensors; compares the present signals of the plurality of driving environment sensors to a minimum requirement for maintaining the automated driving mode; compares the past signals matching the location stamp and time of day stamp to the minimum requirement when the present signals do not meet the minimum requirement; and maintains the automated driving mode when the past signals in memory exceed the minimum requirement.

Figure 2:
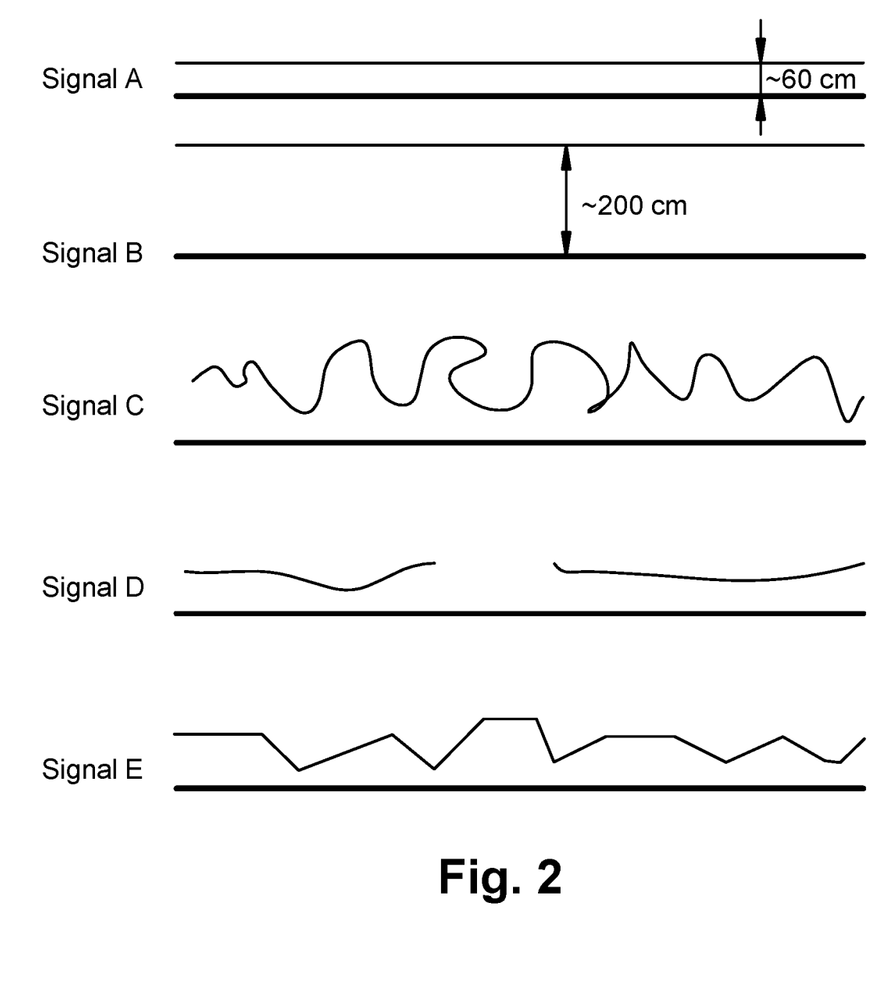
FIG. 2 illustrates representative signals from vehicle environmental sensors from vehicles equipped with the systems of the present invention.

FIG. 2 shows one reasonable signal and four unacceptable signals. Large differences between the filtered/predicted signal and the assumed mid-lane location, or too large a filtered/predicted signal noise level indicate that either one or both of the prediction or the assumed mid-lane position are wrong. Signal B shows a deviation of about 200 cm from the assumed mid-lane location, indicated as the bold line. With Signal B, given that the driver is believed to be in approximately the lane center, a processed sensor measurement of two meters from the center line is implausible. When the prediction and assumption are close enough, such as about 60 cm or less, and the noise level is low enough, as shown by Signal A, the control logic 16 will presume that the lane keeping system could continue even if there are minor gaps in the lane markings.

Should there be sudden, physically impossible changes in the measurement, then these signals may cause uncomfortable or unexpected vehicle control and this location is removed as ADAS-capable. Signal C shows a noisy signal input. Signal D illustrates a gap in the signal. Signal E exhibits a cluttered signal, causing the signal to jump from value to value.

The filter also generates an associated uncertainty for the filtered/predicted value as a variance or standard deviation. This uncertainty value is used to determine when the difference between the prediction and the measurement is too large, such as the difference being greater than two times the standard deviation. Alternatively, the control logic 16 may increase sampling frequency of each sensor to see if the deviation reduces. If the uncertainty becomes too large, automated driving may discontinue functioning and signal that a return to manual driving mode is required. A fault may be transmitted to the driver via the driver information device 22. In addition, the host vehicle 10 may transmit via the transmitter and receiver 34 to a remote database to indicate that this section of road is not ADAS-capable, as will be explained.

Figure 3:
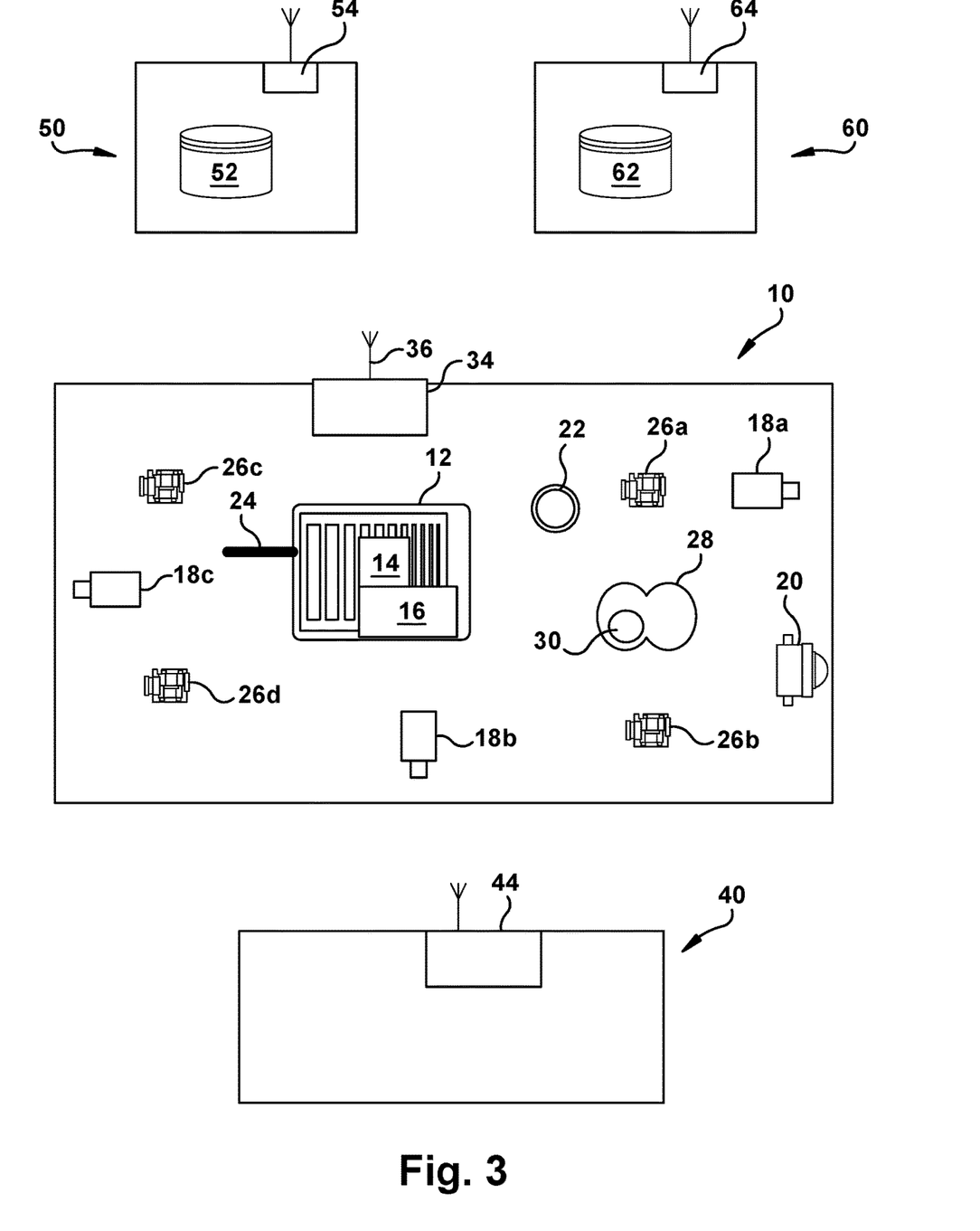
FIG. 3 illustrates a system according to one example of the present invention including the vehicle of FIG. 1.

FIG. 3 illustrates a system for implementing aspects of the invention using host vehicle 10. Controller 12 will transmit signals regarding information gathered from the vehicle environment sensors using transmitter and receiver 34. Information collected and transmitted by the controller 12 may include measurements of the road roughness and the location of the host vehicle 10. Information of where sections of agreement between the vehicle environment sensor signal interpretation and the measured driving conditions of the human operator—as described above—begin and end will be transmitted. The controller 12 may also collect and transmit which sensor signal interpretation algorithm(s) and parameters produce this agreement. The reliability of the signals and the filtered values will be transmitted by the host vehicle 10 as well. Alternatively, the map of the road sections that are ADAS-capable may be made on the host vehicle 10 and transmitted as a map via the transmitter and receiver 34.

The transmitter and receiver 34 may be sending signals to a fleet location 50. The fleet location 50 includes its own transmitter and receiver 54. When the information is received from host vehicle 10, it may be stored in a fleet database 52. Fleet database 52 will include information regarding sensor signals along with the host vehicle 10 location and time when certain sensor signals were received. In one example, the fleet database 52 creates a map of the road sections having good signals and the road sections with marginal or no signals. In another example, the map is created by the controller 12 of the host vehicle 10 and transmitted to the fleet database 52.

This information in fleet database 52 can be accessed by the host vehicle 10 in the future when it is traversing the same roadway. Alternatively, fleet database information may be broadcast ('pushed') or requested ('pulled') as needed during vehicle operation. As part of this invention, the controller 12 of host vehicle 10 can use this information to determine when an absence of signal may be prolonged and may deactivate the automated driving functions.

The transmitter and receiver 34 of the host vehicle 10 may send the same vehicle environment signals to an authority location 60 having its own transmitter and receiver 64. The authority may be a police station or a governmental transportation office. The authority location 60 may store the data in the authority database 62. Authority database 62 will include information regarding sensor signals along with the vehicle location and time when the sensor signals were received, similar to fleet database 52. Alternatively, the authority database 62 will update the map if the map was transmitted.

A second vehicle 40 having its own ADAS with a transmitter and receiver 44 may receive the signals and messages from the host vehicle 10. Alternatively, host vehicle 10 may receive signals and messages directly from the second vehicle 40 regarding sensor signals and location of the second vehicle 40 from the second vehicle ADAS.

In one embodiment, the second vehicle 40 transmits the signal information to the fleet location 50 and/or the authority location 60. All of the information exchanged among the host vehicle 10, the second vehicle 40, the fleet location 50 and the authority location 60 improves the operation of the advanced driver assistance system on each vehicle.

In another embodiment, the map one the fleet database 52 will be updated using information from the second vehicle 40 as well as other vehicles equipped with ADAS. In this manner, the fleet database 52 will serve as the collection point for many maps from many vehicles. The fleet database 52 will determine the reliability of the mapped ADAS-capable areas based on the input from multiple vehicles.

Therefore, a system using a server for compiling advanced driver assistance system data from a plurality of vehicles comprises a receiver for receiving a map of ADAS-capable locations from a plurality of vehicles, each map having a time of day stamp; a transmitter for transmitting a map indicative of locations where automated driver assistance mode can be enabled to a first vehicle of the plurality of vehicles; and a database. The database compiles the maps from the plurality of vehicles to determine if an automated driving mode of the first vehicle can be maintained at a specific time of day and location.

Figure 4:
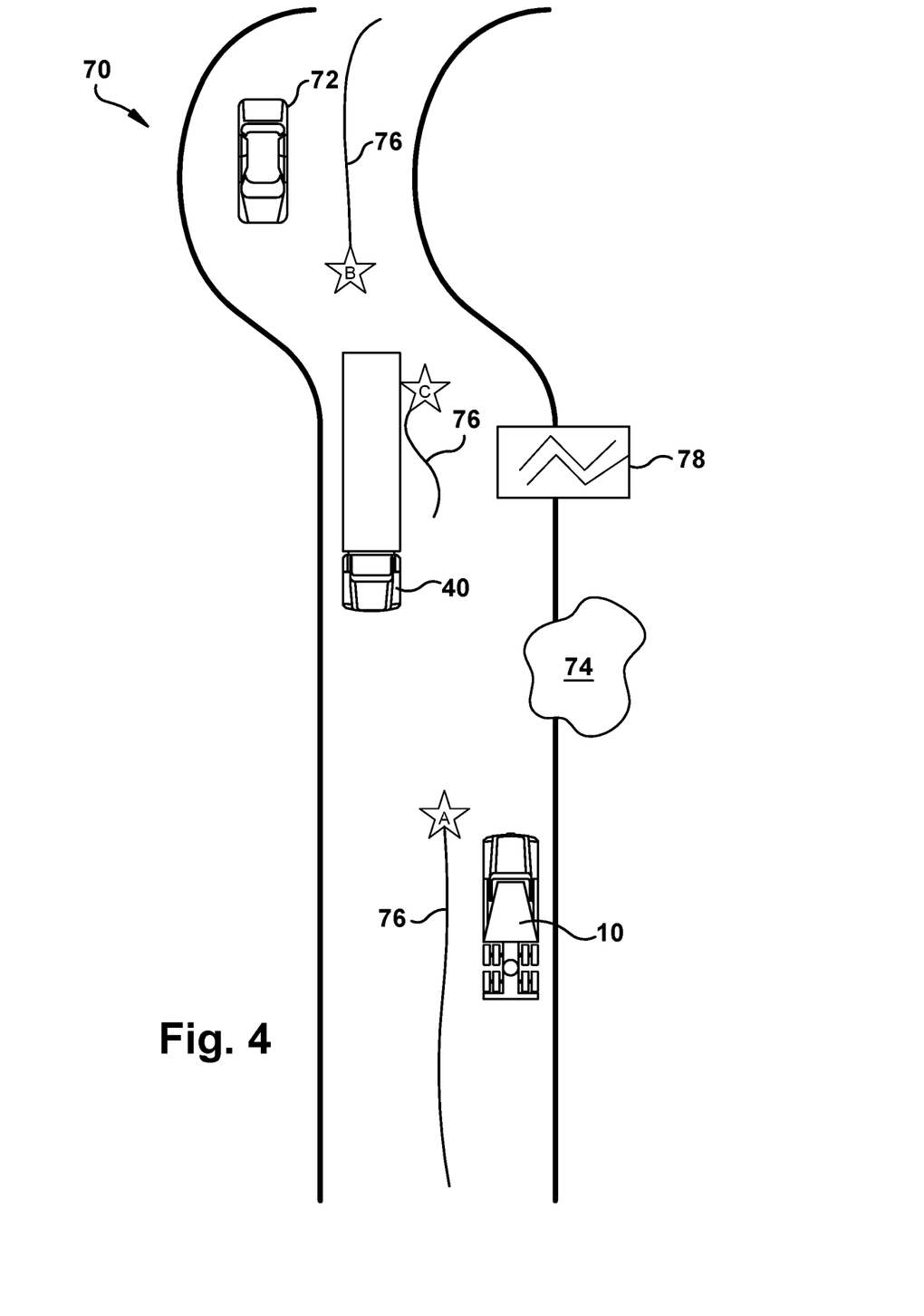
FIG. 4 illustrates a roadway having vehicles equipped with the systems of the present invention.

FIG. 4 illustrates a roadway 70 being traversed by the host vehicle 10 and the second vehicle 40. Both vehicles are equipped with the advanced driver assistance systems as described.

Host vehicle 10 approaches point A of the roadway 70. Point A is where the center lane markings 76 begin to be missing. faded or covered such that the sensors on the host vehicle 10 are unable to clarify their presence. The filter deviation as measured by the control logic 16 may begin to increase with respect to the measurement of the lane markings as host vehicle 10 passes point A.

The control logic 16 of host vehicle 10 may try to use different filters to provide reduced normalized prediction errors so that the ADAS would not shut off between point A on the road and point B on the road, where the line markings reliably continue.

In addition, host vehicle 10 is monitoring its surroundings and interpreting other issues that may be of interest to other vehicles, the fleet location 50 or the authority location 60. For example, the sensors of the host vehicle 10 may identify debris 74 within or proximate to the roadway 70. The sensors may also identify cracks and deformations in the roadway 70. In additional to other vehicles, the sensors will be able to identify objects and roadway issues that may obstruct drivability of the roadway 70. This information, including the time and location stamp, will be of value to the authorities when they receive it in their authority database 62.

While the host vehicle 10 is receiving signals from the vehicle environment sensors, the host vehicle 10 may also take note of a break in the guardrails 78. This information may also be of value to the authorities when they receive it in their authority database 62.

Second vehicle 40, which is also equipped with ADAS according to this invention, continues to transmit data from its vehicle environment sensors. As shown in FIG. 4, some line markings 76 are still visible as the second vehicle 40 travels in the direction opposite host vehicle 10 on the same roadway 70. Second vehicle 40 has already passed point B where the line markings end or are less visible, but then senses the lane marking 76 again as the second vehicle 40 passes point C. As long as the normalized prediction errors remain low enough during collection of data, the ADAS of the second vehicle 40 does not shut off the automated driving mode between points B and C. The sensor signals or map are shared with the fleet database 52.

Host vehicle 10 may access the fleet database 52 to receive information from sensors on other vehicles that have traversed the same roadway 70. Alternatively, it may receive a map of ADAS-capable areas matching the area which the host vehicle 10 is now traversing. The information shared by second vehicle 40 will be available for use by host vehicle 10. Host vehicle 10 will learn that second vehicle 40 detected readable line markings up until point B and then detected them again at point C for a short duration. Host vehicle 10 may run the received sensor information through the normalized prediction errors for the entire section of roadway even though some lane markings 76 are missing between point A and C and point B and point C.

The mapping of the road sections and ADAS-capable roadways continues as long as vehicles equipped with ADAS are available. For example, a third vehicle 72 may be traversing the roadway 70 after second vehicle 40 and may also transmit vehicle environment signals to the fleet database 52 or authority database 62 so that more information will be available to the entire population of vehicles equipped with an ADAS. With repeated traversals of the same roadway section, by one or more ADAS equipped vehicles, evidence is accumulated for the ADAS-capability of roadway sections.

Knowing the time at which the sensor signal was collected is important as some stretches of road may be usable in automated driver assistance mode at certain times of the day but may not be usable at night due to low reflectivity. Alternatively, knowing the time of year, certain stretches of road may blind the driver environment sensors due to straight sunlight. Snow and other weather elements can also blind the sensors. This information may be included in the map information that is collected and then distributed. For example, the fleet database 52 may accumulate enough information to determine that the roadway is ADAS-capable between location B and location C, but only when not wet and only between 11 am and 4 pm, before and after which, for example, a low sun condition may cause roadway glare.

Information regarding whether to maintain an automated driving event includes understanding the information from the sensors on the host vehicle 10 and the information received via fleet database 52 from other vehicles that have traversed the same roadway, such as second vehicle 40 and third vehicle 72. The fleet database 52 is able to map the location of the host vehicle 10 when the automated driving mode is terminated due to lack of vehicle environment signals meeting or exceeding the minimum requirements. Alternatively, the host vehicle 10 transmits information that it is no longer in automated driving mode. The fleet database 52 will continue to receive information from the host vehicle 10 or other vehicles regarding the same stretch of roadway. The fleet database 52 will collect information regarding whether the vehicle environment signals are reliably available at different times from different vehicles. The fleet database 52 can then accurately map the location of the fallout of the signals, or conversely, those locations where signals are available nearly all the time. This ADAS map may be divided into areas where automated lateral control is possible, using lane markings as references, and areas where automated longitudinal control is not possible. In other words, the roadway may have suddenly appearing or confusing targets, not including vehicles, which may validly be expected to be present, because they were present during the last traversal of the roadway by another ADAS equipped vehicle. Vehicles will still use their own vehicle environmental sensors to track vehicles that are constantly moving on the roadway.

Alternatively, the ADAS capable maps are made on the ADAS equipped vehicles and transmitted to the fleet database 52 for sharing with other ADAS equipped vehicles.

An example of a problematic roadway is one that has spurious radar reflections caused by surface irregularities, such as raised manhole covers. These spurious radar reflections may confuse the vehicle's longitudinal control system and thus this section of roadway is not going to be identified as ADAS-capable. The fleet database 52 can review the fallout of the signals over time and over several different vehicles. The fleet database 52 can thereby create a map of the location of the signal fallout and whether it happens consistently or just at certain times of day or with certain vehicles. When the host vehicle 10 plans to traverse the same roadway in the future, the fleet database 52 can provide accurate measurements to the controller 12 to either bridge the gap based on signals from successful travel on the roadway or provide earlier warning to the driver that the upcoming segment will not be automated driving capable.

Another element of maintaining an automated driving mode is knowing the road surface quality. The preferred situation is having a high mu surface with few potholes, frost heaves or other surface irregularities. If these factors are negative, then the automated driving event may not be enabled even if all of the vehicle environmental sensor signals are present. That is, rough sections of roadway may be flagged as not ADAS-capable. Excessive, violent, large amplitude, or unexpected control signals could be generated/required, due to the roughness and hence safe, comfortable, fuel efficient automated driving traversability might not be possible in such areas.

Figure 5:
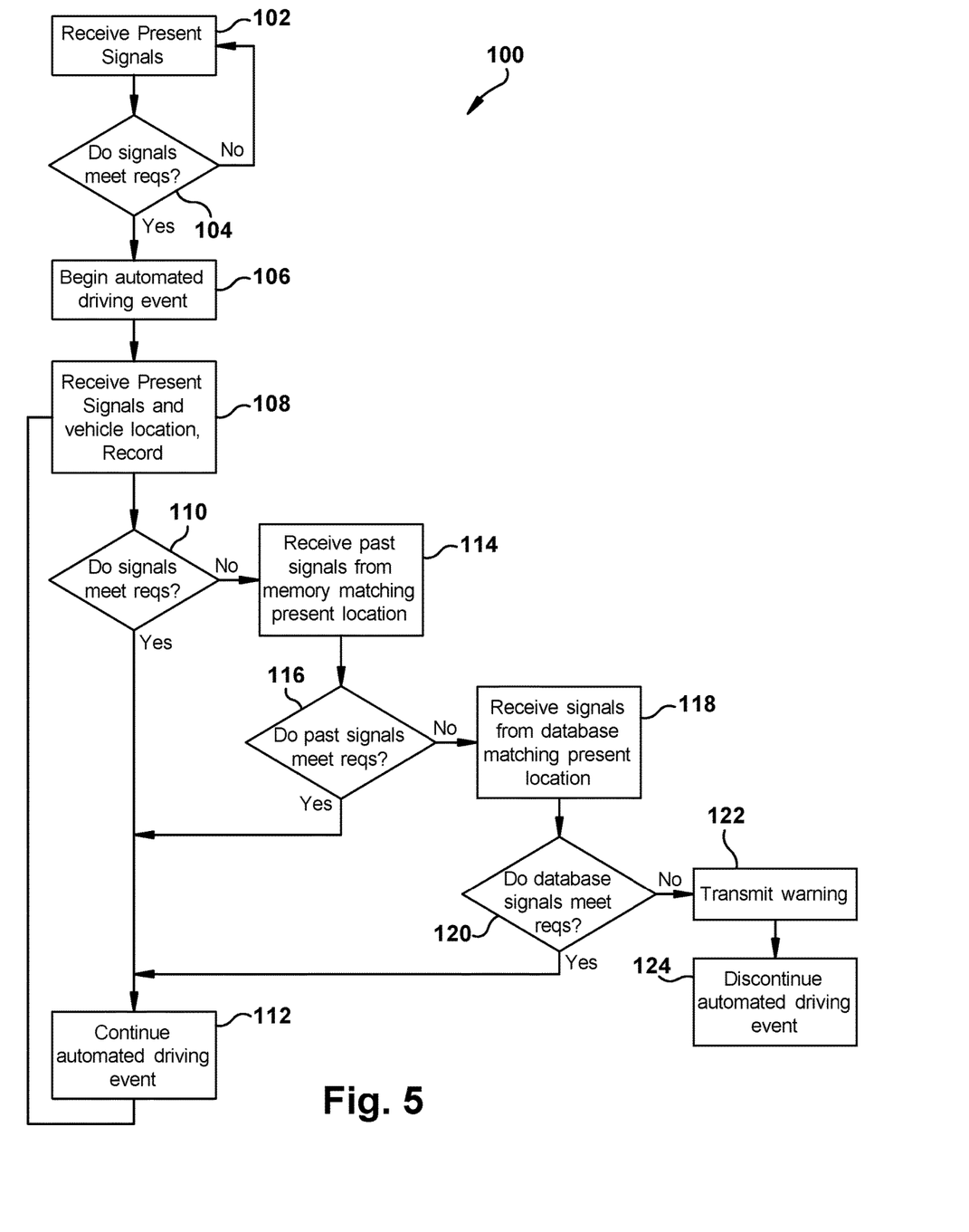
FIG. 5 illustrates a method of operating advanced driver assistance systems according to an example of this invention.

FIG. 5 illustrates a method 100 of enabling or disabling an advanced driver assistance system according to one example of the present invention. The host vehicle 10 receives present signals from the vehicle environment sensors in step 102. In step 104, the signals are compared to minimum requirements. If the signals do not meet minimum requirements to begin an automated driving event, the method 100 returns to step 102 to continue to receive signals.

If the signals do meet minimum requirements, the method continues to step 106 to begin the automated driving event. The controller 12 continuously receives signals from all of the sensors on the host vehicle 10 in step 108. The controller 12 also receives positioning information regarding the host vehicle location as it receives each signal, which may be from a GPS on the host vehicle 10. The controller 12 will record the sensor signal along with the vehicle position and time of day at which the sensor signal was recorded in memory 14.

The controller 12 again compares the signals to a minimum requirement to ensure continuity of signals and expected results as in step 110. The comparison step may include filtering and prediction of the sensor signals. If the signals meet the minimum values and are continuous as expected, the method 100 continues to step 112 to maintain the automated driving mode. The method 100 then returns to step 108 to continue to record and transmit present signals and vehicle location.

If the signals do not meet a minimum value or are discontinued entirely, the method 100 proceeds to step 114. In step 114, the controller 12 reviews signals in the memory 14 to determine if there are signals in memory 14 that were recorded at the same location that the host vehicle 10 is currently in. Those signals are compared to the requirements in step 116. If those signals meet or exceed the requirements, the automated driving mode may be continued as in step 112, especially if a high reliability of sensor signals exist for that same location. The loss of signal may be due to a temporary situation, such as debris in the road.

In one example, if those signals do not meet the requirements, the method 100 continues to step 118. The controller 12 will receive signals as transmitted by other vehicles to the fleet database 52 that have traversed the same location. Those database signals are compared to the requirements in step 120. If those signals meet the requirements, the method 100 continues to step 112 and the automated driving mode is maintained. This type of crowd sourcing of ADAS capable areas allow the host vehicle 10 to rely on its ADAS also working in the same location. These signals can be used to bridge any temporary gaps in signal fidelity.

If those signals do not meet the requirements, the method 100 continues to step 122. The driver of the host vehicle 10 is given a warning via the driver information device 22. In step 124, the automated driving mode ends, and the driver must resume control of the host vehicle 10.

In one example, the control of the vehicle may be split between the human driver and the automated system based on the quality and reliability of the signals. In one example, the human driver may control the vehicle laterally since the lane markings are not reliable and the automated system may control the vehicle longitudinally through adaptive cruise control. The opposite may be true as well.

Figure 6A:
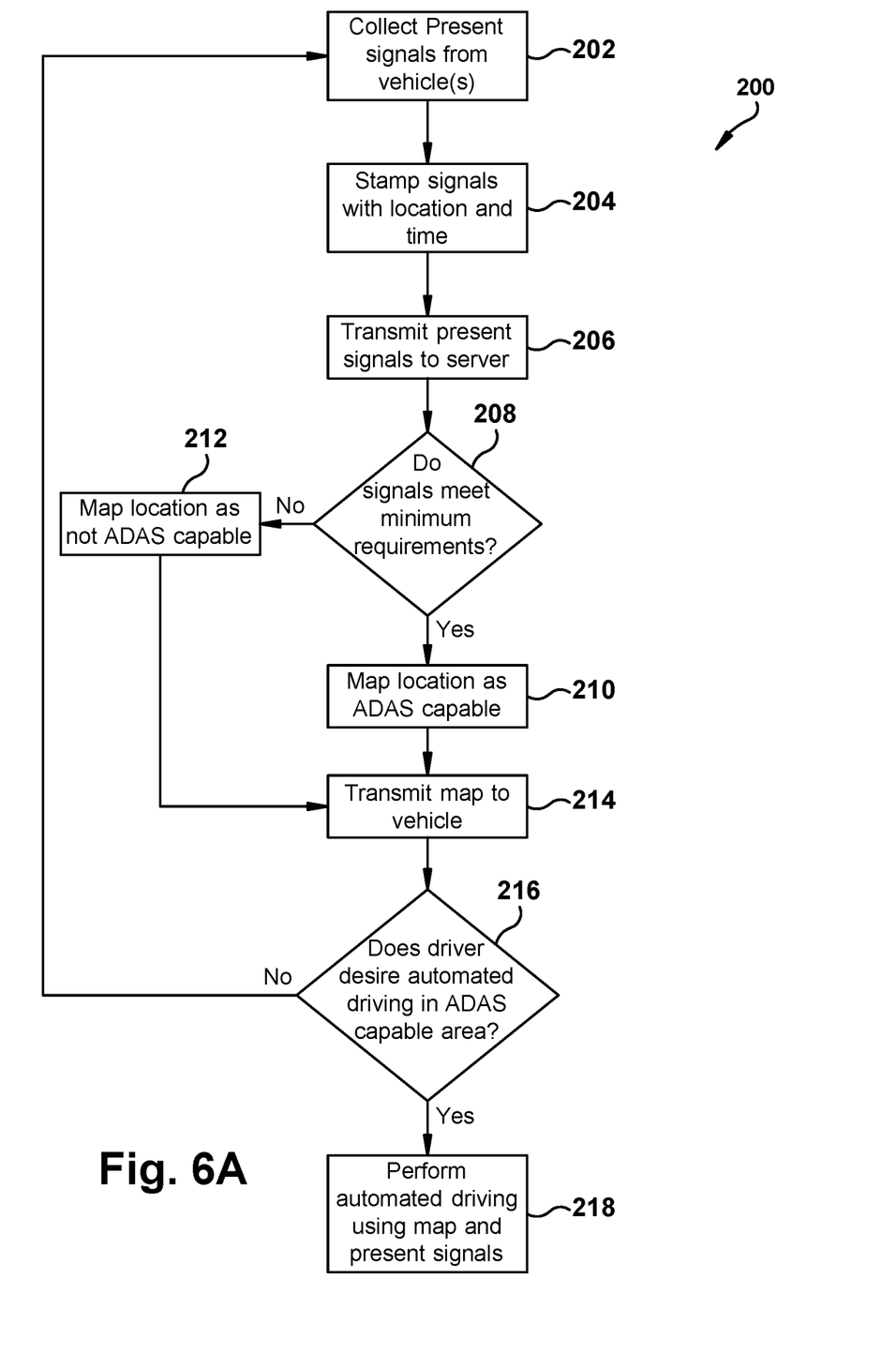
FIGS. 6A and 6B illustrate methods of operating advanced driver assistance systems according to other examples of this invention.

FIG. 6A illustrates another method 200 of determining whether advanced driver assistance systems can be maintained on defined sections of roadways. This method will identify sections of the roadway where actions of a driver of the host vehicle 10 consistently agree, to minimum standards, with those produced by vehicle environment sensor signals of the host vehicle 10. The roadway sections where driver signals and vehicle environment sensors agree are mapped by collating vehicle data with time and location stamps on a remote server. The maps are distributed back to ADAS equipped vehicles, which may then reliably enter an automated driving mode on those mapped sections. Areas of debris are reported and removed from the ADAS-capable section map. The capability for partial automated driving features, such as where only lateral control or only longitudinal control is available, may also be indicated.

Step 202 begins with host vehicle 10 collecting signals from its vehicle environment sensors. The host vehicle 10 is one of a plurality of vehicles equipped with ADAS. In step 204, the control logic 16 stamps the signals with the present location and time of day. In step 206, the controller 12 transmits the sensor signals using data links such as satellite or cellular to a remote server, such as fleet database 52.

The signals are compared to minimum signals levels in step 208 to ensure that the signals would be usable by another ADAS-equipped vehicle. If the signals meet the minimum requirement, the method 200 continues to step 210. In step 210, when the signals collected for a map meet the minimum requirements, the section of map is identified as ADAS-capable, meaning the roadway can support a full or partial automated driving mode. Sensor signals from multiple vehicles are used to create the map. The server maintains this map as more signals are collected. If the signals do not meet minimum requirements, the method 200 continues to step 212 to indicate that the particular section of roadway is not ADAS capable. The method 200 continues to step 214.

In step 214, the data collection map is transmitted back to the host vehicle 10 the next time the host vehicle 10 is traversing the same roadway. ADAS-capable sections deemed too brief to be useful may not be transmitted but can be retained on the server should they become part of a longer, newly ADAS-capable section. The map may be transmitted to a second ADAS-equipped vehicle upon request of the driver. The map may be transmitted if the second vehicle is entering a known ADAS-capable or non-ADAS-capable area.

In step 216, it is determined whether the driver desires automated driving in an ADAS-capable area of the map. Alternatively, the map may also be used should the driver want to drive in the automated mode or if another system, such as driver drowsiness detection, should determine that the driver would benefit from an automated driving mode. The second vehicle will receive information that the upcoming section of roadway is capable of supporting automated driving mode. The second vehicle will still collect its own vehicle environment signals to use in automated driving actions. However, any space that may not be filled in with signals from the second vehicle environmental sensors will be smoothed by the signals already collected in the map. As long as the second vehicle remains in the mapped area, as in step 216, the vehicle will be able to perform automated driving as in step 218. If the driver does not want to perform automated driving or the vehicle leaves the mapped area, the method 200 returns to step 202.

Figure 6B:
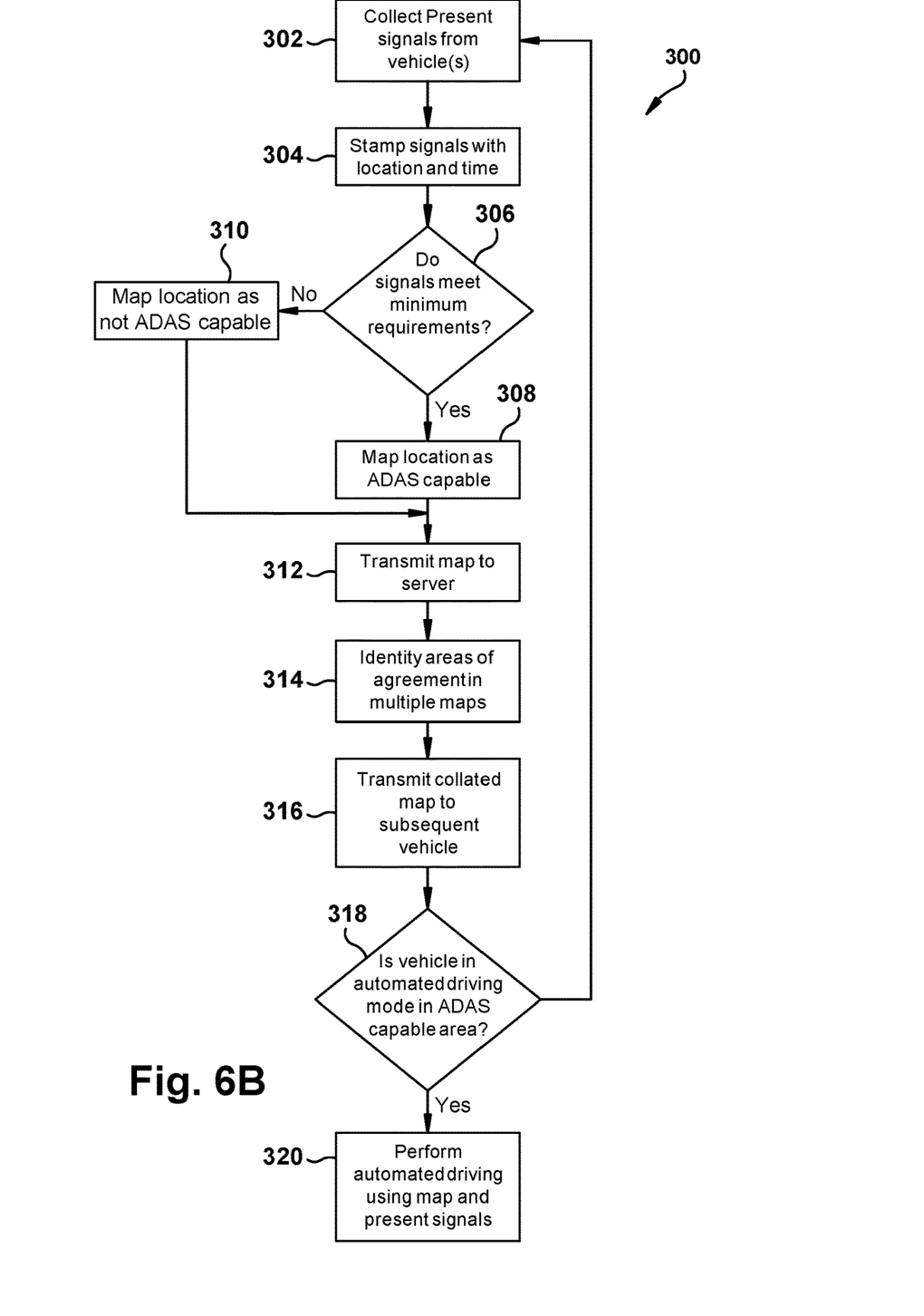

FIG. 6B illustrates another method 300 of determining whether advanced driver assistance systems can be maintained on defined sections of roadways. Step 302 begins with host vehicle 10 collecting signals from its vehicle environment sensors. The host vehicle 10 is one of a plurality of vehicles equipped with ADAS. In step 304, the control logic 16 stamps the signals with the present location and time of day.

The signals are compared to minimum signals levels in step 306 to ensure that the signals would be usable. If the signals meet the minimum requirement, the method 300 continues to step 308 and maps the section as ADAS-capable. If the signals do not meet minimum requirements, the method 300 continues to step 310 to indicate that the particular section of roadway is not ADAS capable. The method 300 continues to step 312.

In step 312, the controller 12 transmits the map of ADAS-capable and non ADAS-capable areas to a remote server, such as fleet database 52.

In step 314, the server will collate all the maps received from multiple ADAS-equipped vehicles. When the maps agree, this ADAS-capable mapped area can support a full or partial automated driving mode with higher reliability. In one example, an ADAS-capable map collated from multiple vehicles will include locations where at least 75% of the samples agree that ADAS is able to be active.

In step 316, the collated data collection map is transmitted back to the host vehicle 10 the next time the host vehicle 10 is traversing the same roadway. The map may be transmitted to a second ADAS-equipped vehicle upon request of the driver. The map may be transmitted if the second vehicle is entering a known ADAS-capable or non-ADAS-capable area.

In step 318, it is determined whether the driver desires automated driving in an ADAS-capable area of the map. Alternatively, the map may also be used should the driver want to drive in the automated mode or if another system, such as driver drowsiness detection, should determine that the driver would benefit from an automated driving mode. The second vehicle will receive information that the upcoming section of roadway is capable of supporting automated driving mode. The second vehicle will still collect its own vehicle environment signals to use in automated driving actions. However, any space that may not be filled in with signals from the second vehicle environmental sensors will be smoothed by the signals already collected in the map (e.g. lane width). As long as the second vehicle remains in the mapped area, as in step 318, the vehicle will be able to perform automated driving as in step 320. If the vehicle leaves the mapped area, the method 300 returns to step 302.

A method for assembling and using a map for supporting automatic driving (ADAS) is disclosed. The map indicates which roadway segments can support automatic driving and may also indicate which vehicle sensor signal interpretation and vehicle control algorithms shall be used on those segments. The map is first assembled, and in a second step, used.

The assembly step uses vehicles as probes. The signals from repeated traverses of roadway segments are examined to see if a driver's decisions sufficiently well match those that the automated system would make, were it driving. That is, a continuous comparison of the driver's control values (steering angle, throttle, brake), and lane position, speed, etc are made with those of what the ADAS would do, were it driving. Those segments where there is sufficiently close agreement between these two signals—those of the driver and those of the ADAS system—are potentially ADAS-capable.

The vehicles transmit back to the server where their driver signals and the ADAS signals substantially agree. This transmission may be in the form, for example, of "ADAS and driver agreement started at location B and ended at location C. Agreement was produced by signal interpretation algorithms 4A and 9B." The server then takes this location and algorithm information and collates it, using repeated traverses of the same roadway segment. These repeated traverses may be from other drivers and other vehicles. A minimum number of traverses may be required to make the map as reliable as possible.

A more recent past-weighted weighted statistical procedure examines the segment traverses for repeated confirmation that the driver and the ADAS system would agree there. Those segments that have sufficient, recent, repeated agreement are marked on the map as ADAS-capable. In one example, an ADAS-capable map collated from multiple vehicles will include locations where at least 75% of the samples agree that ADAS is able to be run on the present segment during the present time of day.

In the use phase of the map, which is distributed back to vehicles that may have need thereof, an indication is given to the driver of an ADAS-capable vehicle that automatic driving may be performed, or is being started, at the current location. The driver may be informed before automatic control is begun. The driver is then warned before the ADAS-capable segment is exited, so that manual control may be resumed. The map may also include information regarding roadway roughness (which affects controllability, security, and comfort), any debris present (which affects traverseability), etc. Segment information continues to be collected even during ADAS operation. Of particular interest is the signal history just prior to an unexpected manual intervention. Should this history show undesirable signal characteristics (high noise, sudden changes, uncertainty, no signal present), then a priority update message may be sent to the server updating the information it stores. A refinement of the map may include capturing the type of vehicle transmitting the ADAS-capable map and then only using that information when the same type of vehicle is traversing the roadway. An automobile may need different signal reliability than a heavy commercial vehicle.

Therefore a method for maintaining an autonomous driving mode comprises receiving sensor signals from the vehicle; transmitting control signals to the vehicle to maintain an autonomous driving mode; determining based on the sensor signals whether to maintain the autonomous driving mode; and transmitting a warning to the driver if the vehicle is going to be taken out of the autonomous driving mode in response to the sensor signals not meeting a predetermined minimum.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An advanced driver assistance system for a vehicle comprising:
   a plurality of vehicle environment sensors; and
   a controller, the controller having
      control logic for controlling an automated driving mode;
      at least one input for receiving present signals from the plurality of vehicle environment sensors; and
      a memory for storing the present signals of the plurality of vehicle environment sensors with a location stamp and a time of day stamp, wherein the control logic
         stores past signals from the plurality of vehicle environment sensors in the memory;
         collates the present signals from the plurality of vehicle environment sensors;
         compares the present signals of the plurality of vehicle environment sensors to a minimum requirement for maintaining the automated driving mode;
         compares the past signals matching the location stamp and time of day stamp to the minimum requirement when the present signals do not meet the minimum requirement; and
         maintains the automated driving mode when the past signals in the memory exceed the minimum requirement.

2. The advanced driver assistance system as in claim 1, wherein the control logic uses prediction filtering on the present signals to determine whether to maintain the automated driving mode.

3. The advanced driver assistance system as in claim 1, wherein the control logic warns a driver if the present vehicle environment signals do not meet minimum requirements for maintaining the automated driving mode.

4. The advanced driver assistance system as in claim 1, wherein the plurality of vehicle environment sensors comprises at least one of a radar device, a camera, an infrared device, LIDAR device and a sonar device.

5. The advanced driver assistance system as in claim 1, wherein the vehicle environment sensors identify debris proximate to the roadway and the control logic disables the automated driving mode.

6. The advanced driver assistance system as in claim 1, further comprising an output for transmitting present signals of the plurality of vehicle environment sensors to a remote server.

7. An advanced driver assistance system (ADAS) comprising:
   at least one input to receive a plurality of present sensor signals indicative of a vehicle environment and a driver's maneuvering of the vehicle;
   at least one output to control the vehicle in an automated driving mode;
   a transmitter for transmitting the vehicle's present location and a map of ADAS-capable sections of roadway based on the plurality of present sensor signals and the driver's maneuvering;
   a receiver for receiving a map of ADAS-capable section of roadway based on a plurality of past sensor signals from a remote server based on the present location of the vehicle; and
   a controller having;
      a memory to store the present sensor signals as past sensor signals; and
      control logic; the control logic collates the present sensor signals with the driver's maneuvering of the vehicle; creates an ADAS-capable map based on the collating, the map having a location and time of day stamp; and transmits control signals to the vehicle to maintain an automated driving mode in response to the vehicle being on a roadway that is ADAS-capable based on the vehicle's present ADAS-capable map and the received ADAS-capable map, wherein the control logic bridges a loss of the present sensor signals by using the received ADAS-capable map so that the automated driving mode is not disabled upon the loss of the present sensor signals.

8. The advanced driver assistance system as in claim 7, wherein the control logic further: determines based on the present sensor signals whether to maintain the automated driving mode; and transmits a warning to the driver if the vehicle is going to be taken out of the automated driving mode in response to the sensor signals not meeting a predetermined minimum.

9. The advanced driver assistance system as in claim 7, wherein the remote server collects data from multiple vehicles to create an ADAS-capable map for transmission to the receiver of the advanced driver assistance system.

10. The advanced driver assistance system as in claim 9, wherein the ADAS-capable map collated from multiple vehicles includes locations where at least 75% of the samples agree that the automated driving mode is able to be enabled on the present segment during the present time of day.

11. The advanced driver assistance system as in claim 7, wherein the control logic prevents the driver from selecting the automated driving mode when no ADAS-capable map exists.

12. The advanced driver assistance system as in claim 7, wherein the vehicle environment sensors identify debris proximate to the roadway and transmit location of the debris to the remote server.

13. A method for maintaining an autonomous driving mode on a host vehicle comprising:
   setting the host vehicle in an automated driving mode based on present signals meeting a minimum requirement for maintaining the automated driving mode;
   transmitting control signals to the host vehicle to maintain an autonomous driving mode;
   receiving a map of ADAS-capable roadways from a remote server based on past signals received from the host vehicle at a particular location and a particular time;
   determining based on the ADAS-capable map and the present signals whether to maintain the automated driving mode at the same particular location and at the same particular time;
   disabling the automated driving mode indicating that ADAS will not function at the particular location and at the particular time in response to the ADAS-capable map; and
   maintaining the automated driving mode in response to the ADAS-capable map indicating that the automated driving mode can be maintained even when the present signals do not meet the minimum requirement.

* * * * *